Sept. 11, 1962     R. B. COLTEN ET AL     3,053,080
NON-AMBIGUOUS DISPLAY ULTRASONIC TESTING APPARATUS
Filed Dec. 26, 1957     5 Sheets-Sheet 1

INVENTORS
Robert B. Colten &
Richard W. Johnston
BY
R. E. Fowler
ATTORNEY

INVENTORS
Robert B. Colten &
Richard W. Johnston
BY R. E. Fowle
ATTORNEY

INVENTORS
Robert B. Colten &
Richard W. Johnston
BY R. E. Fowler
ATTORNEY

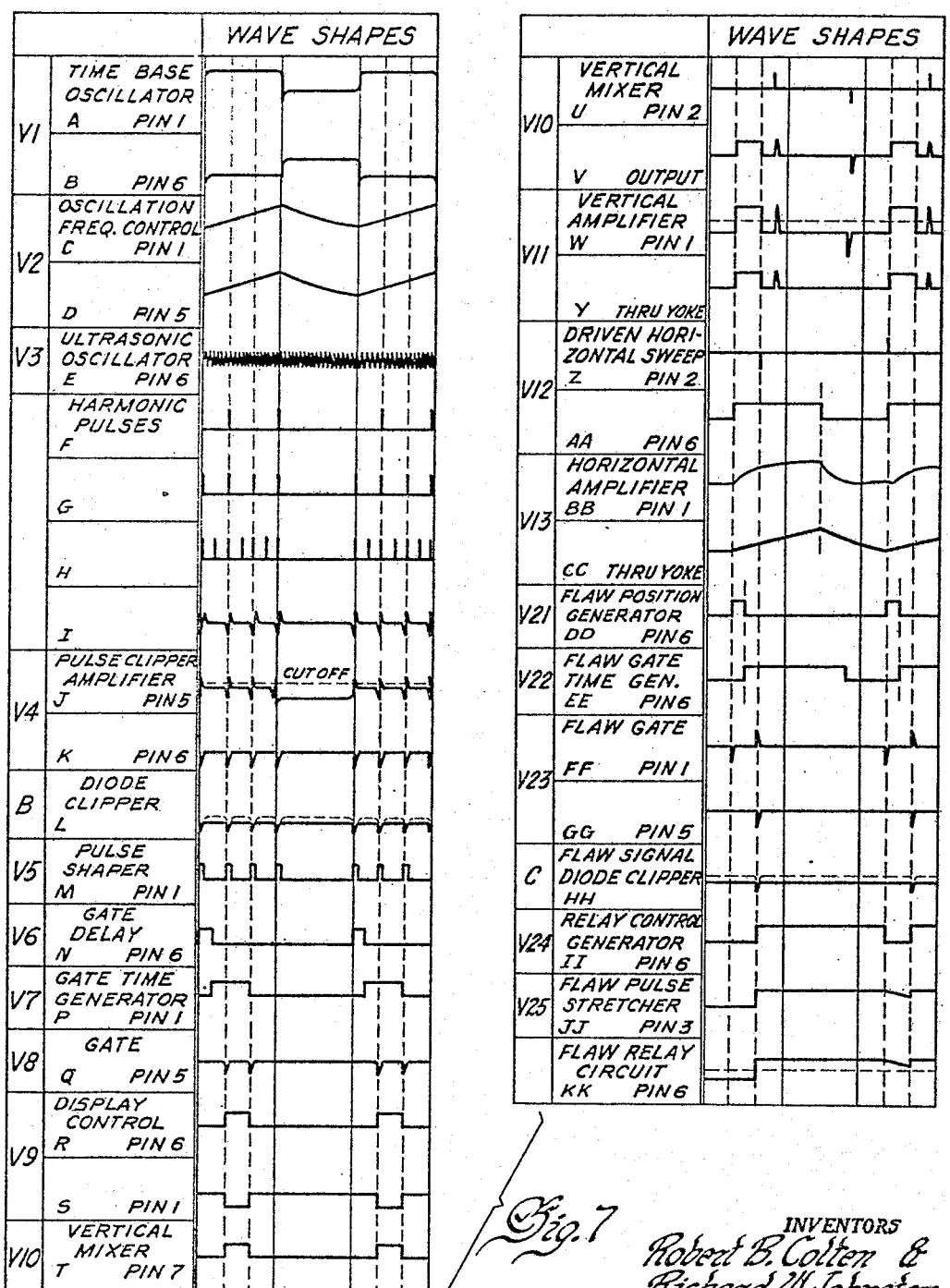

United States Patent Office 3,053,080
Patented Sept. 11, 1962

3,053,080
NON-AMBIGUOUS DISPLAY ULTRASONIC
TESTING APPARATUS
Robert B. Colten, Detroit, and Richard W. Johnston,
Royal Oak, Mich., assignors to General Motors Corporation, Detroit, Mich., a corporation of Delaware
Filed Dec. 26, 1957, Ser. No. 705,298
7 Claims. (Cl. 73—67.9)

This invention relates to high frequency non-destructive testing means and more particularly to such non-destructive testing means as that using a beam of high frequency waves applied to a part to resonate the same and obtain by this method an indication of soundness or dimension.

Ultrasonic means have previously been devised, which, through transducer means, apply a beam of ultrasonic waves to one side of a part. If the frequency of these applied waves is proportionate to the thickness, the part will be set into resonant vibration and such vibration will cause changes in loading to indicate the thickness. Such a measuring system is disclosed in a patent to Erwin and Rassweiler 2,431,234, issued November 18, 1947. In that case, an oscillator is caused to sweep over a particular frequency band which is determined by the material being tested together with the dimensional range. The output of the oscillator is fed to a transducer which is physically applied to the part. When the thickness of the part being tested is a fraction or a multiple of the wave length of frequency applied to the part through the transducer, the area of the part under the transducer will resonate, changing the load on the oscillator appreciably. This gives a very definite signal at that frequency which is used as a measure of the thickness. Since, however, this type of system is based upon resonance of a physical part, not only the fundamental frequency is obtained but also harmonics which as the oscillator proceeds through the frequency spectrum may give indications of almost equal amplitude so that the operator may become confused as to which (fundamentals or one of the higher harmonics) he is reading and may therefore log an erroneous dimension.

The output of this type of measuring system is usually applied to a cathode ray oscilloscope and several spaced pips having vertical traces are obtained along a single horizontal trace as the oscillator is continuously and repetitively swept over the band. Since the operator must know whether the reading is at the fundamental or at what harmonic in order to obtain the correct reading, the ambiguity is confusing.

It is therefore an object in making this invention to provide an ultrasonic testing or gauging system, which provides only a single indicative mark for reading the dimension desired.

It is a further object in making this invention to provide an ultrasonic testing or gauging system which is actuated by only a single response pulse to avoid confusion of other signals.

It is still a further object in making this invention to provide an ultrasonic resonance type measuring system providing a single non-ambiguous dimensional indication.

It is a further object in making this invention to provide an ultrasonic resonance type measuring system, capable of making a decision for classifying parts or controlling a process.

With these and other objects in view which will become apparent as the specification proceeds, the embodiments of this invention will be best understood by reference to the following specification and claims and the illustrations of the accompanying drawings in which:

FIGURE 1A is a diagrammatic showing of the cathode ray tube head with an indicating trace thereon.

FIGURE 7 is a chart of the various wave shapes identifying the location at which each of these wave shapes occur to further illustrate the operation of our system.

As previously mentioned, the basic type of system here involved includes an oscillator which can be swept over a certain frequency spectrum repetitively and which oscillator has its output connected to an electrical-mechanical transducer so that the transducer applies a high frequency vibration to a part to be tested. Briefly, referring to FIGURE 1, the basic tunable oscillator is indicated at V3 and it is caused to sweep over a predetermined band repetitively by the oscillator frequency control V2. A transducer 2 is shown connected to the oscillator V3 and that is physically applicable to the part to be tested. As explained above, when a transducer such as a crystal is applied to a thin sheet of metal, for example, and causes the area of the metal sheet under the crystal to resonate for indicating purposes, as the frequency sweeps over the band, not only a fundamental frequency but some harmonics may also appear which may tend to give an erroneous reading. It is the purpose of the remainder of the system to provide control means so that only one non-ambiguous signal is applied to the cathode ray oscilloscope to provide a reading so that there can be no error in defining the dimension obtained by this system.

Thus, in previous apparatus in a single sweep across the frequency spectrum by the oscillator, a plurality of pips or vertical lines would appear on the horizontal trace of an oscilloscope and unless some means were provided to select the proper indication and eliminate the others, confusion might result. In a single sweep four or five vertical traces on the oscilloscope might appear but only the fundamental be desired as that providing the readable indication for the proper dimension. As illustrative of a frequency band which might be used to test thin sheets of cast iron, the oscillator may be designed to sweep over a range from two to four megacycles. The general theory in the present system is to cause two repetitive signals to be applied to the control for the cathode ray tube to produce the indicating mark and thereafter lock the vertical trace at the actuated level so that it blanks out any further indications in any single sweep. This provides, on the head of the oscilloscope, a single stepped line which gives a very clear and unequivocal reading of dimension.

Figure 1:
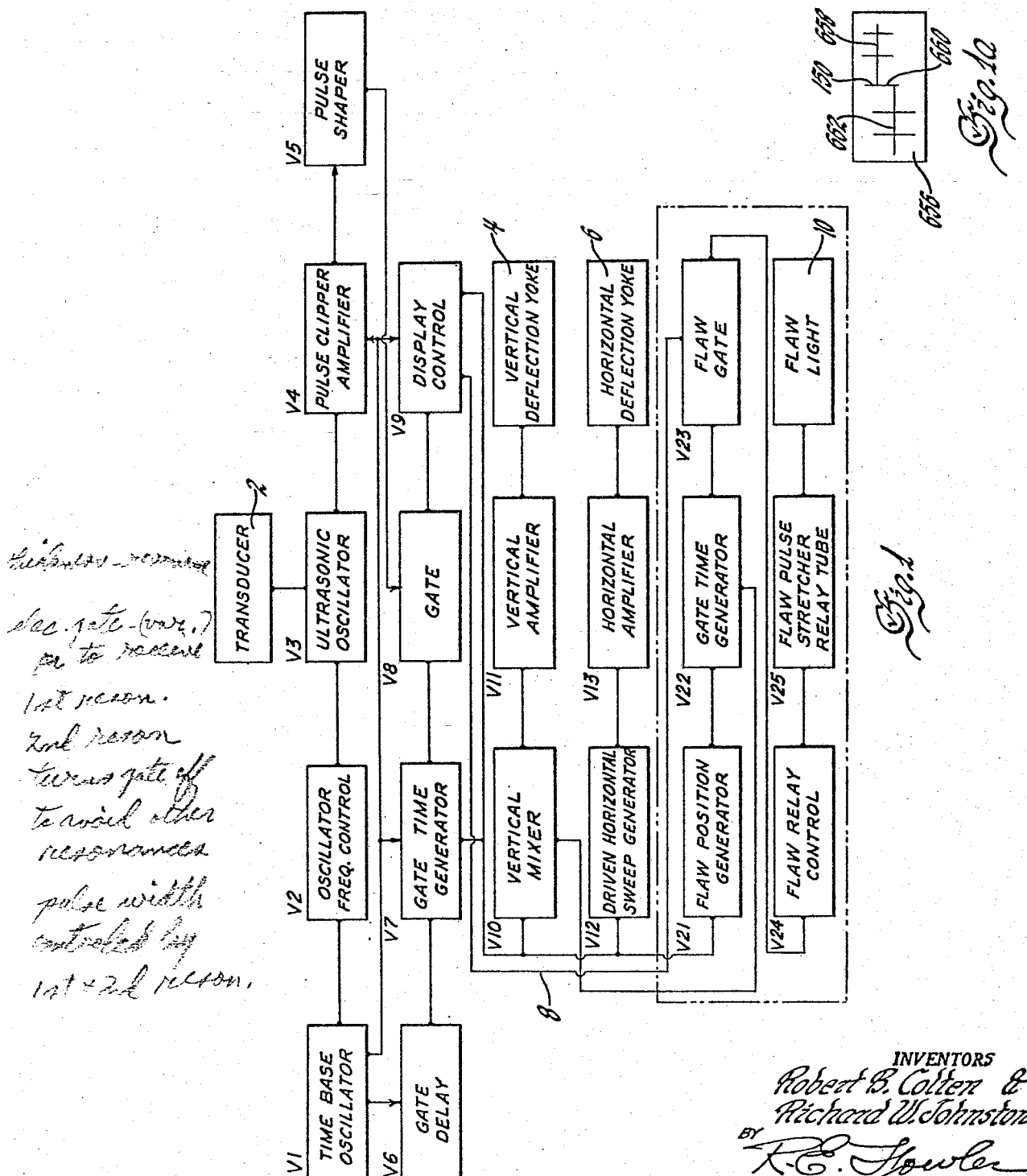
FIGURE 1 is a block diagram of a system for dimensionally gauging a part by the use of high frequency waves embodying our invention.

In order to obtain such a result, the general system as set forth in FIGURE 1 is utilized. The main oscillator V3, together with its sweep control V2 has already been described. Ahead of V2 there is connected a time base oscillator V1 which is a free-running multivibrator which synchronizes and starts the time sequency for all of the other circuits in the system. The time base oscillator V1 as well as controlling the initiating sweep V2 also is connected to a gate delay V6. This gate delay is also a one-shot multivibrator fired by a signal from the time base oscillator V1. The particular constants determine the length of time this section conducts and its output is used to fire the gate time generator V7. The general purpose of this delay is to allow the oscillator V3 to reach the linear portion of its sweep before gate V8 is opened. Gate time generator V7 is also a flip-flop multivibrator which specifically controls the gate V8 next connected thereto. This is an important part of the system inasmuch as it blanks out undesired indications as will be described more in detail at a later point. The output of the gate V8 is connected directly to a display control section V9 which specifically controls the various sections preceding the cathode ray tube. V9 is again a flip-flop multivibrator which is turned on and off by the pulses received from the gate V8. The display control V9 is controlled not only by the gate V8 alone but also by pulses fed through the gate V8 derived from the oscillator V3 which are in turn generated by the transducer load and are the pulses giving an indication of the desired dimension. For these indicative pulses, therefore, the oscillator V3 feeds into a pulse clipper amplifier stage V4. This stage V4 together with the pulse shaping section V5 work together to produce desired pulses properly shaped for final application to the display control means but which is fed back to the gate V8 and then through the gate into the display control V9 for a purpose to be described. The master time base control oscillator V1 is also connected to the gate time generator V7 and the display control V9 as shown by the arrows for re-set purposes at the end of each complete scanning trace and to the pulse clipper amplifier V4 for blocking purposes.

Having now obtained at the display control system timed signals or pulses indicative of dimensions but time controlled to blank out undesired areas, the output of the display control section is applied to various preliminary means ahead of the vertical and horizontal deflection yokes 4 and 6 of the cathode ray oscilloscope. The output of the display control stage is connected to a vertical mixer section V10 in which section two signals are mixed. One is the output of the display control V9 which is the actual thickness signal and the other is a differentiated square wave from the flaw gate time generator V22 which will later be described in detail. The output of the vertical mixer section V10 is then fed to the vertical amplifier V11 and thence on to the vertical deflection yoke 4 of the oscilloscope.

The output of the display control means is likewise applied to a horizontal sweep generator V12 which is again a one-shot multivibrator triggered by the output of the display control generator. This section produces a wave which serves two purposes. One is to control the intensity of the cathode ray oscilloscope and the other is to supply a sawtooth control voltage to the grid of the horizontal amplifier V13 to produce a sweep control. V13 of course actually produces the sweep for the cathode ray oscilloscope and its output is connected to the horizontal deflection yoke 6. These controls, therefore, determine the trace pattern on the head of the oscilloscope.

Figures 5, 6:
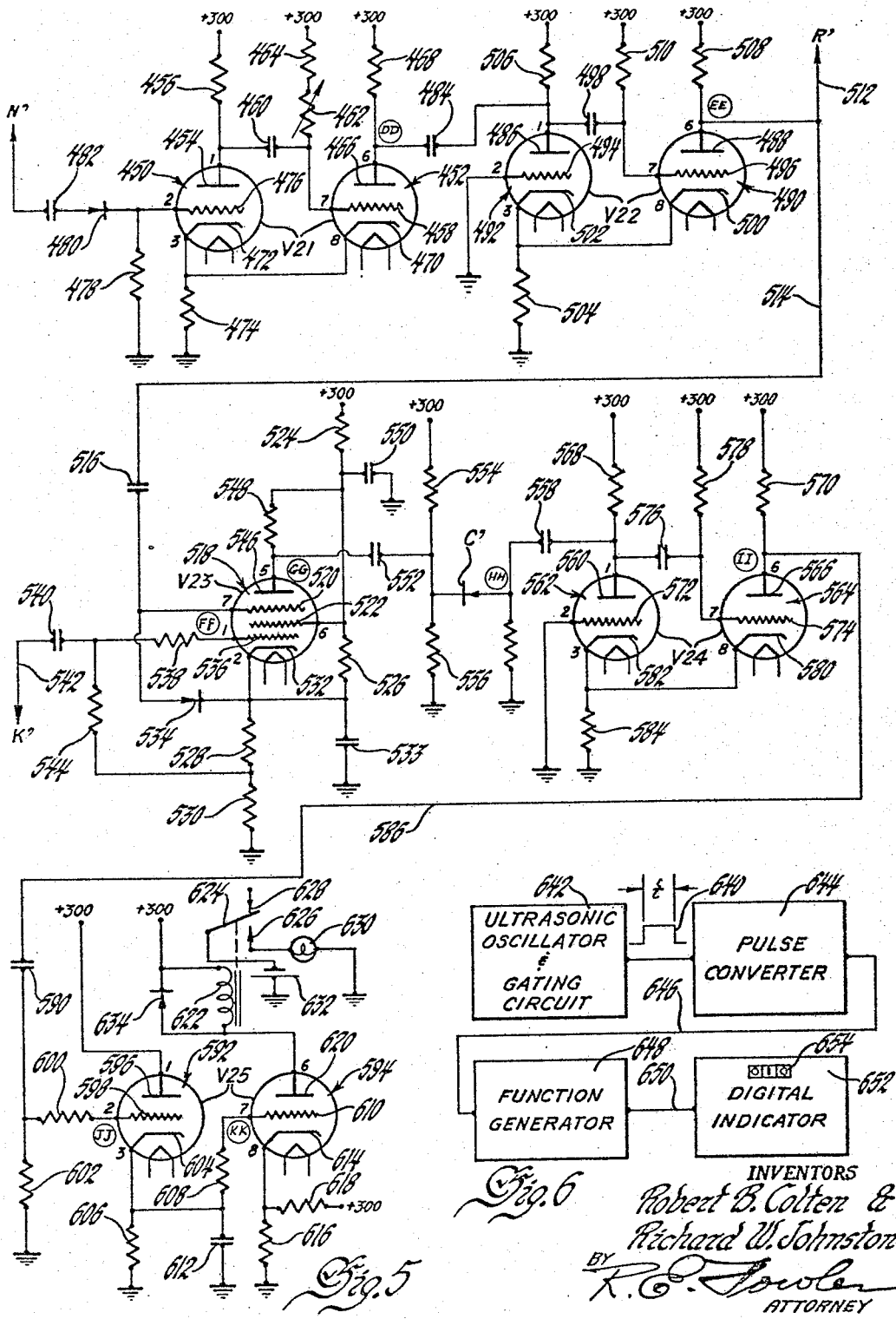
FIGURE 5 is a circuit diagram showing that portion of the complete system indicated in the lower two sections of the block diagram FIGURE 1 and identified as V21 through V25, specifically.
FIGURE 6 is a block diagram illustrating a modified form of indicating means for producing a readable result.

The portion within the dash and dotted outline containing those sections V21 to V25 are specifically shown in FIGURE 5 and may be broadly defined as the flaw reject circuits. It is advantageous to utilize controls for automatically testing parts so that they may be caused to be classified or selected through automatic means. For this purpose, a flaw position generator V21 is also connected to the output of the display control and the same pulse which is applied to the oscilloscope is applied to the generator V21. This is also a one-shot multivibrator producing a negative wave as will be described more in detail at a later point. This negative wave is applied to a flaw gate time generator V22 which is also a one-shot multivibrator generating a pulse which opens and closes the flaw gate V23 to which it is connected. It is to be noted that this flaw gate is also connected to the display control section V9 directly through line 8 and therethrough obtains a differentiated signal from that section. If the flaw gate is open, then the signal from the display control will pass and the output signal from the flaw gate is fed to the flaw relay control V24. This circuit is again a one-shot multivibrator and is used to extend the flaw signal so that the flaw relay will stay energized as long as the flaw is displayed on the screen. The output signal from the flaw relay control V24 is therefore applied to a flaw pulse stretcher relay tube V25 to extend the energization of the relay. This section V25 actually includes two sections, one of which is a pulse stretcher or continuer and the second section is an actual relay as will be seen later from a detailed discussion of this section. The output of the flaw pulse stretcher section V25 is applied directly to a flaw light indicating to the operator the condition of the part which has just been tested.

Figure 2:
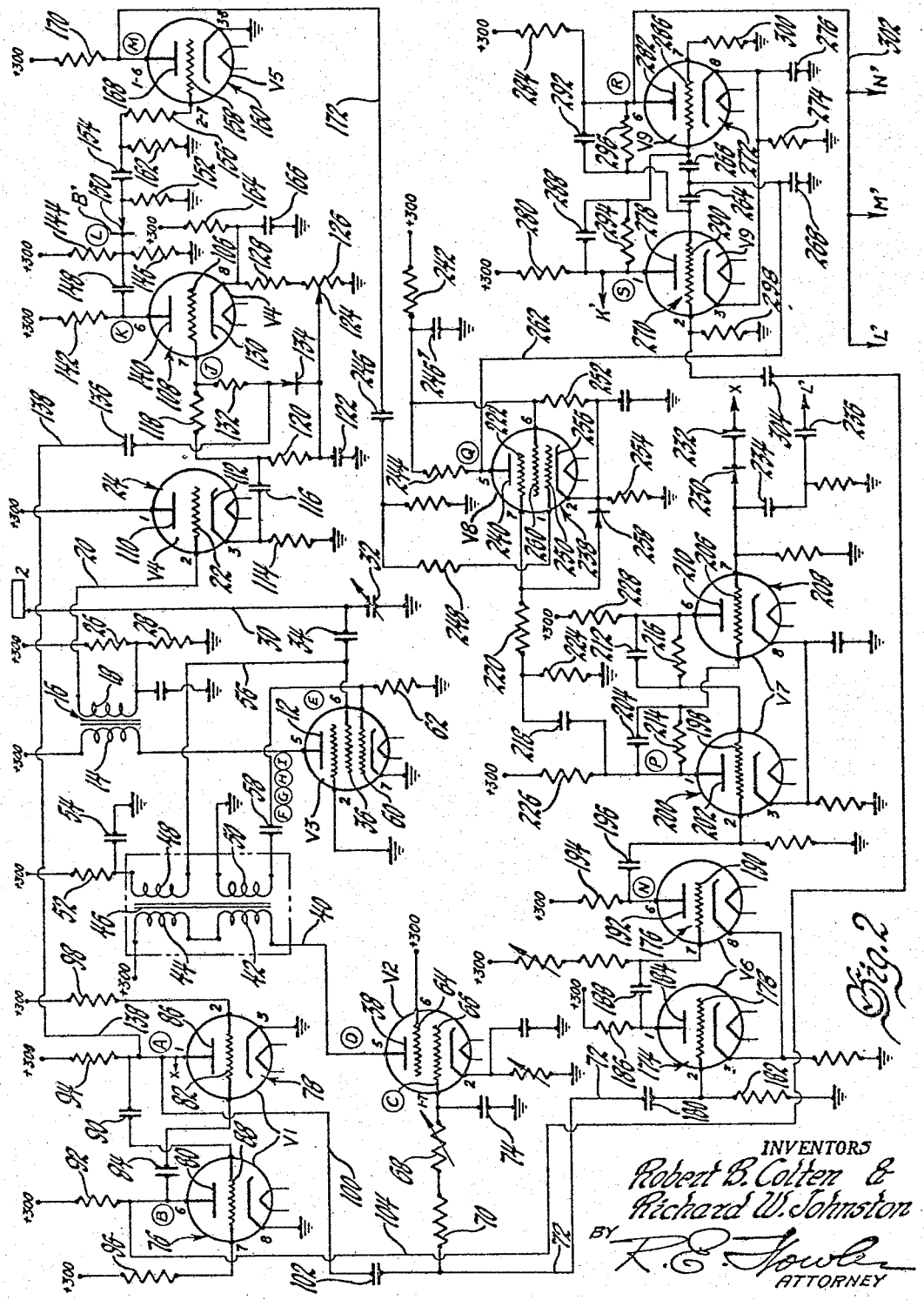
FIGURE 2 is a partial specific circuit diagram of our measuring or indicating system including those parts of the block diagram identified as V1 through V9 respectively.

With the above as a general outline of the various components and functions of the parts of our apparatus, reference is now made specifically to FIGURE 2 which shows in detail those parts of the system indicated on the top two rows of the block diagram in FIGURE 1. It is of course obvious that a power control section is utilized with this complete system to provide the necessary voltages and polarities needed but that has not been described since it is conventional.

In FIGURE 2 the oscillator section which includes the tube V3 has its plate 12 connected to a suitable source of power indicated as +300 through the primary winding 14 of a coupling transformer 16. The output of said coupling transformer 16 consists of a secondary winding 18, one terminal of which is connected directly through line 20 to the control grid 22 of tube 24 forming one-half of the pulse clipper and amplifier section V4. The other terminal of the secondary 18 is connected to a point intermediate two resistances 26 and 28 which form a potential divider between the power source +300 and ground. The transducer 2 previously described is connected through line 30 to ground through a variable condenser 32 to form a fine tuning control and also through coupling condenser 34 to screen grid 36 of the oscillator tube. The oscillator is caused to sweep over a predetermined frequency through a signal fed to it by the oscillator frequency control section indicated generally at V2. The tube in that case has its plate 38 connected through line 40 and two transformer primary windings 42 and 44 in series to the power supply +300. These two primary windings are commonly mounted on a core 46 and inductively related to two separate secondary windings 48 and 50. Winding 48 has one terminal connected through load resistor 52 to the main power supply line +300 and also through a filtering condenser 54 to ground; the other terminal of secondary winding 48 is connected through line 56 to screen grid 36 of the oscillator tube V3. The other secondary winding 50 has one terminal grounded and the other connected through coupling condenser 58 to control grid 60 of the oscillator tube which grid is also connected through biasing resistor 62 to ground. Thus the oscillator tube is designed to oscillate over a certain band of frequencies through the adjustment of tuning condenser 32 and the values of the other circuit components and is caused to sweep over the desired range through the signal fed to the tube V3 from the output of plate 38 of tube V2. The oscillator frequency control section V2 has screen grid 64 connected to the main power supply +300. The control grid 66 of this tube is connected through a variable resistance 68 and a fixed resistance 70 in series therewith to line 72, through which it receives a triggered pulse signal from the time base oscillator to initiate operation of the whole system. Grid 66 is also connected to ground through condenser 74.

The time base oscillator section V1 is a free-running multivibrator including two tubes 76 and 78, the plate 80 of tube 76 being coupled to the grid 82 of the tube 78 through condenser 84 and plate 86 of tube 78 being in like manner coupled to grid 88 of tube 76 through condenser 90. Both plates are connected to the power supply +300 through load resistors 92 and 94 respectively. Grid 88 is likewise connected to the power supply +300 through a resistance 96, and grid 82 through resistance 98. When the proper power supply is connected to this portion of the circuit, section V1 operating as a free-running vibrator introduces a pulse to the sweep oscillator control V2 and that causes the oscillator V3 to scan over a band of frequencies determined by the components of the circuit. The output of the oscillator is applied to the transducer 2 and that in turn introduces a beam of high frequency oscillations into the part.

Before leaving this portion of the system, it is desired to refer momentarily to the various wave shapes which are obtained at certain points in the circuit. FIGURE 7 shows in the chart the wave shape appearing on plate 86 (or pin 1) of tube 78. This wave shape is lettered A on the chart and its existence at the point on FIG. 2 is indicated by A. This wave is applied through line 100 and coupling condenser 102 to line 72 and thence to control grid 66 of the oscillator frequency control V2. At the same time that wave form A appears on plate 86, wave form B appears at pin 6 on tube 76. This is similarly indicated on FIG. 2 by B. This wave, of course, is the opposite of that appearing at A and where one wave goes positive, the other goes negative. Wave form B is applied through line 104 to the display control section V9 which will be described at a later point. Wave form C on the chart FIGURE 7 shows a sawtooth wave which is applied to the grid 66 of the tube V2 as indicated on FIG. 2 by C. This produces the sweep for the oscillator. The amplified sawtooth wave D appears on the plate 38 and is fed over to the oscillator V3.

The oscillator V3 is a high frequency oscillator which generates high frequency waves which in the example stated, change in frequency from two to four megacycles. Thus on the output electrode and therefore on pin 6 at the point marked E the high frequency waves such as shown in the chart FIGURE 7 at E, appear. When the part that is in contact with the transducer 2 goes into resonance either fundamental or harmonic, there is a decided change in the load current of the oscillator which produces pips or vertical pulses as the oscillator swings across the band. These are illustrated by letters F, G, H and I, all of which appear on the plate 12 of tube V3 and these letters are therefore located adjacent to said plate on FIG. 2. The output of the oscillator V3 is fed to the pulse clipper amplifier and thus there is illustrated on the chart FIGURE 7 under J the pulses similar to I on the plate 12 of tube V3 which are applied to the grid 106 of tube 108 through a cathode follower connection from the first tube section 24. The letter J is located adjacent to grid 106 to show the wave form thereon. The connection between the output of the oscillator is through the coupling transformer 16 which then applies the pip or pulse to the grid 22 of amplifier tube 24 whose plate 110 is connected to the source of power +300 and the cathode 112 is connected through resistor 114 to ground. The cathode 112 is also connected through condenser 116 and a series resistance 118 to the control grid 106 of the amplifying tube 108 to further amplify the same. A point intermediate the resistance 120 and condenser 122 is connected to an adjustable tap 124 movable over resistor 126 which is connected in series with resistance 128 between cathode 130 of tube 108 and ground. Resistance 132 and diode rectifier 134 are connected in series between the grid 106 and adjustable tap 124. A point intermediate the resistor 132 and the diode rectifier 134 is connected through condenser 136 and line 138 to plate 86 of the time base oscillator V1, as indicated by the arrow connection on both ends of the line. This enables the injection of a pulse from the overall timing control system to the grid 106.

The plate 140 of the tube 108 is connected to the power supply line +300 through a load resistor 142. A voltage divider consisting of two resistances 144 and 146 in series extend between the power supply +300 and ground and an intermediate point between these two resistances is connected by a coupling condenser 148 with plate 140. A diode clipper circuit which includes diode 150 and a resistance 152 and condenser 154 are connected from a point between the resistances 144 and 146 to the input circuit of the pulse shaping section V5. The resistance 152 is connected between one terminal of the diode 150 and ground and a condenser 154 is connected from the same terminal to one end of limiting resistor 156, the other terminal of which is connected to control grid 158 of the tube 160. A further biasing resistor 162 is connected between condenser 154 and ground. A potential divider for the cathode bias of tube 108 including resistance 164 is connected between the +300 power supply and in series with resistances 128 and 126 to ground. The cathode 130 is connected between resistances 164 and 128 and a bias provided therefor at this point. Condenser 166 is connected between the cathode 130 and ground. The wave form as shown at J on the chart which is applied to the control grid of the pulse clipper amplifier as shown at J on FIG. 2 and amplified to appear as K on plate 140 and is then applied to the diode clipper 150, 152, 154 and reduced in amplitude so that the wave appearing at B' as indicated is shown at L in FIGURE 7 and L, as indicated by that letter at this locale. The clipped wave is then applied to the pulse shaper V5 and amplified and shaped so that wider pips as shown at M on the chart appear on the plate 168 of the tube V5 and are so indicated by M appearing at this location. The plate 168 is provided with the proper voltage from the main power supply +300 through load resistor 170 connected between the plate and the source. The output of the pulse shaping section V5 which appears as wave form shown at M now is applied to conductive line 172 and to the gate section associated with V8.

Before describing the gate section in detail it would be best to return to the sections which control the gate. These are the gate delay circuit V6 and the gate time generator V7. The gate delay system V6 is a one-shot multivibrator including two triode tubes 174 and 176, the first triode section control grid 178 being connected to line 72 through a coupling condenser 180 and also to ground through biasing resistor 182. Line 72 is fed with synchronizing or initiating pulses from the primary time base oscillator V1 and these are applied to the grid 178 of the first tube 174. The plate 184 of the tube 174 is provided with power from the +300 line through load resistor 186 and is also connected through coupling condenser 188 with control grid 190 of the second tube 176. In like manner, the plate 192 of the tube 176 is provided with power from the +300 source through load resistor 194 and connected through coupling condenser 196 with the next section which is the gate time generator V7. The circuit constants of the gate delay V6 determine the length of time that the second tube 176 conducts and the negative output obtained from plate 192 is used to fire the gate time generator V7. The delay provided by section V6 is required to permit the oscillator to reach the linear portion of its sweep before the gate V8 is opened. Again tracing the pulses which are applied to the various portions of the system, the gate delay section will have applied the wave shape appearing at point N on the chart FIGURE 7, and this wave form which in this instance is a single pulse at the beginning of each sweep will appear on plate 192 as indicated at that location by N.

This wave is applied to the control grid 198 of the first tube 200 of gate time generator V7. This section is a flip-flop multivibrator which changes its conductivity from one tube to the other depending upon the signal. The plate 202 of this section is therefore connected through a coupling condenser 204 to the control grid 206 of the second tube 208 of this flip-flop circuit. The plate 210 of the tube 208 is connected back to the control grid 198 of the first section through a coupling condenser 212. A shunt resistance 214 is connected across condenser 204 and in similar manner a shunt resistance 216 is connected across condenser 212. Since this is a flip-flop multivibrator the tubes 200 and 208 alternately conduct but it is the conductivity of the first tube 200 which is utilized to control the gate V8. The plate 202 is therefore connected through coupling condenser 218 and a resistance 220 in series therewith to the control grid 222 of the gate circuit V8. A bias resistor 224 is connected between a point intermediate the resistance 220 and the condenser 218 to ground. Plates 202 and 210 are connected to the main power supply +300 through load resistors 226 and 228 respectively. The wave shape N which appears on plate 192 of the gate delay is applied to the control grid 198 of the gate time generator and controls the conductivity periods of tube 200. As a result, there appears on plate 202 of tube 100 that wave form identified as P on the wave shape chart and it is defined as appearing on that plate by P near plate 202. This signal or wave shape is the one which is applied to the gate to open the same at a prescribed time and also cause it to close.

The grid 206 of the tube 208 is connected to one terminal of a diode rectifier 230 which is connected in series with a coupling condenser 232. The later series connection is then connected back to the output of the time base oscillator at plate 86 of tube 78. An arrow indicates this connection as was previously done when line 138 was shown connected to this point to simplify the diagram. Grid 206 is likewise connected through a series condenser connection including condensers 234 and 236 to a point on the display control section V9 which has not yet been described. Since this is also shown as an incomplete connection suffice it at this time to mark this point L' and later describe where L' is connected in the display control unit. Also point X is connected to pin 1 of tube V1 as indicated by X at that location. Through this connection the time base oscillator V1 can re-set the display control V9 at the end of a sweep cycle. In this manner, control pulses injected into the grid 206 from other points will assist in the control of the conductive periods of the tube 200. The gate time generator therefore controls the operation of the so-called gate section to permit or prevent the passage of certain pulses applied thereto.

The gate section itself includes tube 238 whose plate 240 is supplied with power from the +300 volt source through load resistances 242 and 244 in series. A point intermediate these two resistors is connected to ground through a filter condenser 246'. This tube passes pulses when it is open but acts as a barrier thereto when it is closed. The system, therefore, if operating properly, closes upon the leading edge of the second pulse applied to it and the full pulse does not pass through it. The output of this gate is fed to the display control section V9. The wave shape P from the gate time generator is applied to grid 222 as explained above. A pulse from the pulse shaping section V5 is applied through line 172, coupling condenser 246 and resistor 248 to the control grid 250 of the tube 222 to apply signals thereto. A potential divider consisting of resistance 242, resistance 252 and resistance 254 in series is connected between the +300 volt line and ground. The cathode 256 of tube 238 is connected to a point intermediate the resistors 252 and 254 to provide a bias voltage therefor and is also connected through diode 258 with the grid 222. Screen grid 260 of the tube 238 is connected to a point intermediate resistors 252 and 242 thus giving it its bias. The wave form P is applied to grid 222 and the wave form Q is derived on plate 240 and applied to the display control through line 262. The existence of wave form Q at this location on FIG. 2 is indicated by the letter Q. It was previously mentioned that wave form M from the pulse shaper was applied to grid 250 so that the resultant wave form Q is formed by a combination of the two.

The next section is the display control V9. To this section which generally controls the display device such as the cathode ray oscilloscope, there is applied a certain pulse if the gate V8 is open and permits passage therethrough. The output of V8 is therefore connected directly to the input circuit of the control display V9 and plate 240 is connected through line 262 to a point intermediate two condensers 264 and 266. Line 262 is also connected to ground through a bypass condenser 268. Two triode tubes 270 and 272 are included in this display control section, the cathodes of which are commonly connected together and to ground through resistor 274 and condenser 276 in parallel therewith. It is noted that this section is also a flip-flop multivibrator that is turned on and off by pulses from the gating tube V8. It is turned on by the first pulse to arrive and turned off by the second pulse.

The first triode has a plate 278 and is connected to a source of voltage +300 through load resistor 280 and plate 282 of the second triode section is similarly connected to the +300 power source through a load resistor 284. Plate 278 is cross-connected to control grid 286 of the second tube 272 through resistance 294. A condenser 288 is connected in shunt to resistance 294 and plate 282 is in similar manner connected to control grid 290 of the first tube through resistance 296. A shunt condenser 292 is connected across resistance 296. Biasing resistor 298 is connected between grid 290 and ground and a similar biasing resistor 300 is connected between control grid 286 and ground. Coupling condenser 264 has one terminal connected to control grid 290 and coupling condenser 266 likewise has one terminal connected to control grid 286. Tube 272 of the multivibrator section is the tube which controls the display means by applying its output to certain points in the gate time generator, vertical mixer, and horizontal sweep generator as indicated by the arrows L', M' and N' respectively, coupled to plate 282 through line 302.

It is further to be noted that the conductivity of the first triode 270 of section V9 is effected through a pulse applied to control grid 290 through line 104 and coupling condenser 304 extending from the time base oscillator to said first tube. The point L' is adapted to be connected to pin 7 of tube 208 of the gate time generator V7. The point M' is adapted to be connected to pin 7 of section V10 shown in FIGURE 3 and indicated as M' and N' is adapted to be connected to pin 2 of the V12 section shown in FIGURE 4. The tube 272 is conductive at the beginning of a measuring period and is turned off by the first pulse through line 262 from the gate section V8. This produces an indication on the head of the cathode ray tube as will be explained. The next pulse turns it on and it then stays blocked to provide the desired single non-ambiguous indication on the cathode ray tube. In the event that no second pulse is produced, due perhaps to a very thin section being tested, then a reset pulse from the time base oscillator V1 applied through line 104 turns it off and there is no thickness display. The signal appearing on the output of this section is that shown at R on the chart FIGURE 7 and therefore it is indicated as R on plate 282 on FIG. 2. This plate signal is fed to several different points: (1) the cathode ray tube vertical deflection circuits through line M', (2) to the horizontal sweep generator through N', (3) to the time gate generator through L', and (4) to any reject circuits as may be used. It is of course obvious that there will be a similar phased wave form S appearing on plate 278 of the other half of this circuit which can be used for flaw reject apparatus if desired.

Figure 3:
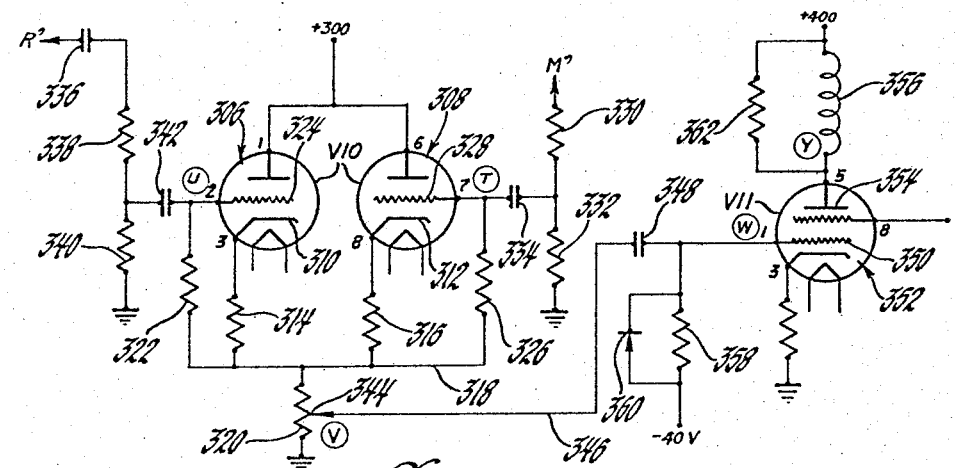
FIGURE 3 is a circuit diagram showing specifically the construction of the vertical mixer indicated as V10 in FIGURE 1.

Proceeding now to the specific description of the immediate controls for the cathode ray oscilloscope shown in sections V10, V11, V12 and V13, reference is made specifically to FIGURE 3. In that figure there is shown the vertical mixer section V10. This circuit includes two triode tubes 306 and 308, the plates of which are commonly connected to the positive voltage supply. The two cathodes 310 and 312 are connected respectively to the biasing resistors 314 and 316 to a common line 318 and thence through a single resistance 320 to ground. A resistor 322 is connected between control electrode 324 of the first triode 306 and line 318. In like manner, a resistor 326 is connected between control grid 328 of the second tube 308 and line 318. As previously mentioned, the output wave R from V9 is applied to point M' and thence to the voltage divider formed of two resistors 330 and 332 connected in series between line M' and ground. A coupling condenser 334 is connected to a point between the two resistors 330 and 332 and the control grid 328. The point R' in FIGURE 3 is connected to a point to be described in the flaw gate time generator V22 and has a wave impressed thereon depending upon the conditions in that section. This point is connected through coupling condenser 336 and to series resistors 338 and 340 to ground. A point intermediate the resistors 338 and 340 is connected through coupling condenser 342 to the control grid 324 of tube 306. This circuit is utilized to mix two signals, one coming from the display control section and applied to point M' and the other being a differentiated square wave from the flaw gate time generator V22. The wave form appearing on the control grid 328 from the display control section is T and is shown on the chart FIGURE 7. While we have not yet described in detail how the signal is derived, suffice it at this point to state that the wave form generated in the flaw gate time generator is that shown at U on FIGURE 7 and is shown as the letter U adjacent pin 2 of the tube 306. These two signals are therefore fed into this section and through a cathode follower type connection are mixed and developed across a common resistor 320 and a desired amount of this compound mixed signal is taken off through adjustable tap 344 which is connected through line 346 and coupling condenser 348 to control grid 350 of the next section.

This next section is the vertical amplifier section V11 and includes a multi-electrode tube 352, the plate 354 of which is connected to a higher positive potential in the voltage supply indicated as +400 volts through the vertical deflection yoke 356 of the cathode ray oscilloscope. This section therefore is used to control the vertical signal in the cathode ray oscilloscope. The grid 350 is likewise connected to a suitable source of biasing potential indicated as —40 volts through biasing resistor 358. A diode 360 is connected in shunt across the resistor 358. A further shunt resistor 362 is connected across the vertical deflection coil 356. The resultant signal obtainned from the output of the vertical mixer section V10 is that shown at V on the wave chart. The letter V adjacent the movable tap 344 indicates its location on the circuit diagram FIGURE 3. Its application through coupling condenser 348 produces wave form W on the chart which is applied to the No. 1 grid of the tube 352 as shown by letter W at that location. Through the exterior bias applied to control grid 350 of this tube it is normally biased beyond cutoff. The application of the input signal (wave shape W) makes the tube conductive and causes current to flow through the vertical deflection coil 356. The wave shape of the current so flowing in the vertical deflection coil is indicated at Y on the wave chart FIGURE 7 and its location is shown on FIG. 3 of the drawings by the letter Y. This produces that portion of the resultant signal applicable to the oscilloscope.

The output of the display control V9 is also applied to the horizontal sweep generator V12 as discussed through connection N'. The horizontal sweep generator V12 includes two tubes 364 and 366. The plate 368 of the first tube 364 is connected through load resistor 370 to the +300 voltage supply and plate 372 of the second tube 366 is connected to the same voltage source through load resistor 374. The +300 voltage source is likewise connected to the control grid 376 of the second tube 366 through resistor 378 and plate 368 is connected to control grid 376 through condenser 380. This sweep generator section is a one-shot multivibrator which is triggered by the square wave from the display control generator and applied to point N'. This wave is coupled to the control grid 382 through a coupling condenser 384 and a rectifier 386 in series between point N' and the grid 382. A biasing resistor 388 is connected between control grid 382 and ground. The wave form from the display control is shown at Z on the wave shape chart 7 as it appears on control grid 382 and it is therefore illustrated by letter Z at this point. The cathodes 390 and 392 of the tubes 364 and 366 respectively are commonly connected together and through biasing resistance 394 to ground.

Figure 4:
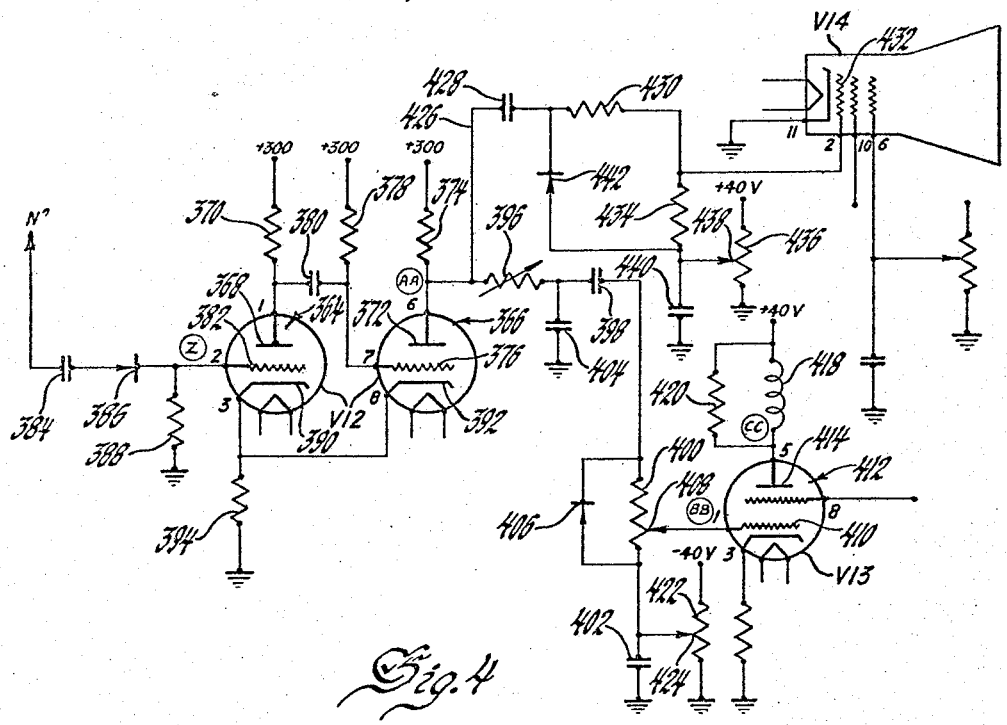
FIGURE 4 is a circuit diagram showing the associated input circuit to the cathode ray tube V14, specifically identified as V12 and V13 in FIGURE 1.

The application of wave shape Z to the input of this section pin 2 produces on plate 372 of the second tube 366 a wave shape as shown at AA on the wave chart. This is again indicated by the letters AA adjacent pin 6 of the tube 366. This wave shape AA serves two purposes. One of those is to regulate the intensity of the pulse or the illuminated spot on the cathode ray tube. The second is to supply a sawtooth wave voltage or sweep voltage to the grid of the horizontal amplifier for the cathode ray osilloscope. For this second purpose, the output of tube 366 is fed into the input of the next section which is the horizontal amplifier V13. Plate 372 is therefore connected through a variable resistance 396 in series with a coupling condenser 398 to one terminal of a resistor 400. The opposite terminal of resistor 400 is connected to ground through a bypass condenser 402. A similar condenser 404 is connected from a point intermediate the variable resistance 396 and the condenser 398 to ground. A diode 406 is connected in shunt around resistance 400. A variable tap 408 which is movable over the surface of resistor 400 permits the adjustment of signal amplitude. This variable tap 408 is directly connected to control grid 410 of the tube 412 of the horizontal sweep amplifier V13. The plate 414 of this section is connected directly to a higher potential source indicated as +400 through the horizontal deflection yoke 418 of the oscilloscope. A resistance 420 is connected in shunt to the deflection yoke 418. In order to provide the proper bias for the tube 412, resistor 422 is connected between a suitable bias potential source —40 and ground. A movable tap 424 is provided which moves over the surface of resistance 422 and this tap is connected to a point intermediate resistor 400 and condenser 402 to apply an initial biasing potential to the control grid 410. Thus the output of the section V12 is applied to the horizontal amplifier V13. The wave form identified as BB is applied to pin 1 or to the control grid 410 and is indicated in FIG. 4 by BB adjacent pin 1. This wave form produces a sweep wave in the output circuit of this coil which is shown at CC in the chart FIGURE 7 and illustrated by CC adjacent pin 5 of tube 412 in this figure. This wave causes the oscilloscope to sweep horizontally across the band.

As before mentioned, the output of the section V12 is likewise connected to the intensity control and this is through line 426 to one terminal of a coupling condenser 428. A limiting resistor 430 is connected between the other terminal of condenser 428 and the control grid 432 of the cathode ray tube V14. This grid controls the intensity of the spot. The grid is also connected to ground through biasing resistor 434 and a portion of resistance 436 connected between the —40 volt power source and ground and having an adjustable tap 438 movable over its surface to determine the bias. The adjustable tap is also connected to ground through bypass condenser 440. A diode 442 is connected in shunt across resistors 430 and 434.

Having now described in detail that circuitry associated with the vertical and horizontal deflection means of the oscilloscope, it is next desired to define the indicating and selecting or rejecting means which may be associated with the device. The particular parts are those shown within the dash and dotted rectangle in the lower part of FIGURE 1. This portion of the system provides means to actuate selecting apparatus to classify parts between satisfactory and unsatisfactory or to energize indicating apparatus to define the classification of the parts. The first of these flaw reject circuits is identified as V21, flaw position generator, which is shown in block diagram form in FIGURE 1 and which is specifically shown circuitwise in FIGURE 5. This flaw position generator is a one-shot multivibrator consisting of two triode tubes 450 and 452. The plate 454 of the first tube is connected through load resistor 456 to the source of power indicated as +300. Plate 454 is also directly connected to control grid 458 of the tube 452 through a coupling condenser 460. Grid 458 is likewise connected to the power source +300 through a variable resistor 462 in series with a load resistor 464. Plate 466 of the tube 452 is connected to the source of power through load resistor 468. The cathodes 470 and 472 are commonly connected to ground through biasing resistor 474. The control grid 476 of the tube 450 is connected to ground through a biasing resistor 478 and also through a rectifying diode 480 and coupling condenser 482 to the plate 282 of the display control tube 272. This connection is indicated as N' and is adapted to be connected to the arrow labeled N' at the lower righthand corner of FIGURE 2.

This impresses a pulse on the flaw position generator through this input circuit which in turn develops a square wave pulse on the plate 466 as shown at DD in FIG. 5 and whose wave shape is shown on FIGURE 7 at DD. This square wave pulse developed for gating purposes, is set for a desired minimum thickness by the flaw position control which is the variable resistor 462 in the grid circuit of the tube 452. Unless, therefore, the thickness reaches a certain dimension, no signal will be produced in this section. The square wave gate control wave DD is then applied through a coupling condenser 484 to the plate 486 of the section V22 which is a time gate generator. As in many of the other instances, this section is a one-shot multivibrator provided to generate a pulse for opening and closing the flaw gate. The pulse provided by this section V22 is identified as EE shown on FIGURE 7 and appears on the plate 488 of tube 490 FIG. 5 as indicated by EE. Thus when the square wave form DD goes negative, the step wave front in EE is generated to provide a flat top extended control pulse.

The application of the wave form DD to the plate 486 of the first tube 492 of the section V22 produces the wave form EE on the plate 488 of the second tube. In this section the control grid 494 of the tube 492 is directly grounded. Plate 486 is connected to control grid 496 of the second tube 490 by a coupling condenser 498 and cathodes 500 and 502 of the two tubes are commonly connected to ground through biasing resistor 504. The plates 486 and 488 are connected to the power supply +300 through load resistors 506 and 508 respectively and grid 496 is connected to the power supply through limiting resistor 510. The wave form EE appearing at the output of this section is fed both to the vertical mixer V10 through line 512 and which is connected to terminal R' and also through line 514 and coupling condenser 516 to the input of the flaw gate V23. This wave EE provides a visual indication on the cathode ray tube of the thickness to which the flaw gate is set for classification, and of course the application to the flaw gate itself operates selecting means.

The flaw gate V23 consists of a multi-element tube 518 whose control grid 520 has the signal from line 514 applied directly thereto. A screen grid 522 is connected from a point intermediate two resistors 524 and 526 which form part of a voltage divided between the +300 volt source and ground. Series resistors 528 and 530 form the remaining portion of said voltage dividing circuit. The cathode 532 of tube 518 is connected to a point intermediate resistor 526 and 528 and takes its bias from this point. Cathode 532 is also directly connected to ground through a bypass condenser 533. A rectifier 534 is connected directly between grid 520 and cathode 532. A second control grid 536 is provided in the tube. A series resistor 538 is directly connected to the control grid 536 and also through coupling condenser 540 to line 542 which extends to the plate 278 of the display control grid section V9 as shown by the arrow and letter K'. This, therefore, applies a pulse wave shape S differentiated through this connection to provide a wave shape shown at FF on FIGURE 7, to the control grid 536 and if the flaw gate is open or potential on control grid 520 is elevated as shown in wave form EE, then the tube will pass a signal to perform the proper classification of parts.

A further biasing resistor 544 is connected between a point intermediate condenser 540 and resistor 538 to a point intermediate the two resistors 528 and 530. Thus if the two signals are present at the same time a classifying pulse will be passed. The character of this pulse is shown at GG on FIGURE 7 and indicated by GG adjacent the plate 546 in FIG. 5. Plate 546 of the tube 518 forming V23 is connected through resistance 548 to a point intermediate resistors 524 and 526. This point is also connected to ground through bypass condenser 550. Plate 546 is likewise connected to a diode clipper network C through a coupling condenser 552. This condenser 552 has one terminal connected to a point intermediate two resistances 554 and 556 which provide a voltage divider between the source of power +300 and ground. It is also connected to one terminal of a rectifier C', the other terminal of which is connected through a coupling condenser 558 to the plate 560 of a tube 562 which forms the first half of the next section V24 which is the flaw relay control. This crystal diode clipper clips the input signal wave shape GG to cut off noise. This produces a signal wave HH at the output of the diode clipper as shown by HH at this point in FIG. 5 which is the signal applied to the plate of the flaw relay control V24.

The flaw relay control is again a one-shot multivibrator which is used to stretch or extend the flaw signal so that the relay will stay energized as long as the flaw is displayed on the screen. This section consists of two tubes 562 and 564. The plates 560 and 566 respectively are connected to the power supply +300 through load resistors 568 and 570 respectively. Control grid 572 of tube 562 is grounded. Control grid 574 is connected directly to plate 560 of the first tube through coupling condenser 576 and also to the +300 power supply through limiting resistor 578. Again the cathodes 580 and 582 are commonly connected to ground through a biasing resistance 584. Waveform HH applied to this flaw relay control produces a stretched or extended energizing wave shown at II on FIGURE 7 and indicated by II adjacent the plate 566 of tube 564.

This extended energizing pulse is then fed through line 586 and coupling condenser 590 to the input of the next section which is the flaw pulse stretcher relay V25. This is the section which actually operates the indicating and/or control relay and consists of two triode sections which may be in one tube or as shown in two separate tubes 592 and 594. Plate 596 of the first section 592 is provides this conversion. The equation upon which the function generator operates is $$S \text{ equals } \frac{K}{t}$$

in which

K equals a constant
$t \sim$ time as an example:

$t \sim$ 5–20 milliseconds
$S \sim$ thickness (75–300 thousands)

Incidentally this section may be a dividing network. Thus, the function generator 648 will provide an inverse function converting the D.C. voltage appearing on line 646 to a second D.C. voltage appearing on line 650 which is proportional to thickness. As a result there is obtained on line 650 a D.C. voltage to be applied to a digital indicator 652 whose value is proportional directly to thickness in thousandths of the part and which reads said thickness directly on an indicator 654.

We claim:

1. In measuring means, electro-mechanical transducer means applicable to parts under test to vibrate the same in order to measure a dimension, tunable means for generating electrical oscillations connected to the electro-mechanical transducer means to drive the same repetitively over a band of frequencies as the means is tuned to cause the part to vibrate at resonant frequencies within the band traversed, control means connected to the electro-mechanical transducer means and activated by a first resonant pulse encountered in sweeping across a portion of the band of frequencies under study and deenergized by the next succeeding pulse to produce a square output wave whose width is a measure of the dimension under study and means for converting said square wave output into visible indications connected to said control means to indicate the width of the pulse, said last-named means being calibrated in distance.

2. In measuring means, electro-mechanical transducer means applicable to parts under test to vibrate the same in order to measure a dimension, tunable means for generating electrical oscillations connected to the electro-mechanical transducer means to drive the same repetitively over a band of frequencies as the means is tuned to cause the part to vibrate at resonant frequencies within the band traversed, control means connected to the electro-mechanical transducer means activated by a first resonant pulse encountered in sweeping across a portion of the frequency band under study and deenergized by the next succeeding pulse to produce a square output wave whose width is a measure of the dimension under study, converting means connected to said control means for changing the pulse into a D.C. voltage whose value is proportional to the width of the pulse and indicating means connected to the converting means to indicate the value of the D.C. voltage, said indicating means being calibrated in dimensional factors.

3. In measuring means, a high frequency oscillator for producing electrical waves, sweep control means connected to said oscillator for causing it to repetitively sweep over a predetermined band of frequencies, an electro-mechanical transducer connected to said oscillator and driven thereby to change electrical waves to mechanical waves and which is adapted to be placed on a part to be tested to mechanically drive the same at frequencies within the band and to resonate the same if the dimension of the part being tested falls within the range, amplifying means connected to the oscillator to receive and amplify any pulses therfrom generated due to change in load on said oscillator at resonant frequencies of the part, visual display means upon which a visual indication is developed by pulses received, gating means connected between the output of the amplifying means and the input of the visual display means to control the application of pulses generated in the oscillator to the visual display means, and main synchronizing means commonly connected to the sweep control means connected to the oscillator to cause it to initiate its sweep over the band and also to the gating means to simultaneously open the same substantially initially at the beginning of a scanning cycle and preparing said visual display means for the reception of pulses from the amplifying means representative of resonant frequency indications, a first resonant pulse from the oscillator passing through said open gating means to the visual display means and conditioning the gating means for closing and a second resonant pulse passing through to the visual display means and closing said gating means so that no more resonant pulses may be passed through the gating means through that sweep cycle.

4. In measuring means, a high frequency oscillator for producing electrical waves, sweep control means connected to said oscillator to cause it to repetitively sweep over a band of frequencies, an electro-mechanical transducer connected to said oscillator and driven thereby to change electrical waves to mechanical waves and which is adapted to be placed on a part to be tested to mechanically drive the same at frequencies generated by the oscillator to resonate the part, amplifying means connected to the oscillator to receive any pulses generated due to a change in the load on the oscillator caused by resonance of the part, electronic display means upon which visual indications are developed by application of pulses thereto, gating means connected between the amplifying means, sweep control means and the electronic display means to control the application of pulses from the sweep control means or those generated in the oscillator by the resonance of the part to the electronic display means, electronic switching means for controlling the gating means connected between the sweep control means and the gating means, said gating means including a flip-flop circuit connected in feedback relation to said electronic switching means and actuated by the sweep control means to open said gating means at the beginning of each sweep and by the second sequential resonant pulse thereafter to switch said gating means from open to closed condition, closing the same to limit the passage of said resonant pulses to the electronic display means to two resonant pulses in a single scanning cycle and thus measure the time period between adjacent generated resonant pulses.

5. In measuring means, an oscillator having an output circuit, means connected to the oscillator for repetitively tuning it over a predetermined band of frequencies, an electro-mechanical transducer connected in said oscillator output circuit which is adapted to be placed upon a part to be gauged to mechanically drive the same whose impedance will be varied as the part is set into resonance at a plurality of different related frequencies as the oscillator is tuned over the band, which oscillator develops a pulse in the output circuit at each resonant frequency due to change in oscillator load, an oscilloscope having a vertical and a horizontal deflecting means, amplifying means connected to the output circuit of the oscillator and amplifying any output resonant pulse generated thereby when a resonant frequency of the part is reached in the scanning cycle, said amplifying means being connected to the vertical deflecting means of the oscilloscope to produce on said oscilloscope signals at said resonant frequencies, gating means connected between the amplifying means and the vertical deflecting means of the oscilloscope to control the application of pulses to the vertical deflecting means, a time base oscillator of low frequency connected to said gating means and to said oscillator to initiate each repetitive tuning cycle of the oscillator and to condition the gating means for the passage of pulses at the start of each scanning cycle, said gating means including a flip-flop multi-vibrator circuit so constructed as to block upon receipt of a second control pulse from the amplifying means and prevent passage of any further pulses generated in the oscillator during any one scan-connected directly to the power source +300. The control grid 598 of this section is connected through resistor 600 to a point intermediate the coupling condenser 590 and a biasing resistance 602, the opposite terminal of which is grounded. This section gives a high positive D.C. output wave shown at JJ on the wave shape chart FIGURE 7 and appearing as indicated adjacent cathode 604, FIG. 5. Cathode 604 is connected to ground through biasing resistor 606 and also connected through resistor 608 to the control grid 610 of the second triode section 594. This is a cathode follower connection and therefore the potential of cathode 604 controls the potential of the grid 610. The cathode 604 is also connected directly to ground through bypass condenser 612. The cathode 614 of tube 594 is biased through a fixed resistance 616 connected between cathode 614 and ground and cathode 614 is also connected through load resistor 618 to the power source +300.

Plate 620 of the section 594 is directly connected through relay operating coil 622 to the source of power +300 and is adapted to attract its armature 624 when energized so that it will engage lower contact 626 but permit armature 624 to be drawn up against an upper contact 628 when the relay coil 622 is not energized. Lower contact 626 of the relay is connected through an indicating light 630 to ground, said light being energized when the switch is closed. The armature 624 is connected through battery 632 to ground to provide an energizing current for the light when it is in its lower position. A rectifier 634 is connected directly across relay winding 622. Thus when waveform 35 appears on the plate 620 of this section V25, relay coil 622 is energized and the indicating light 630 is turned on indicating the condition of the part being tested. This armature switching means can also of course be used to actuate any other classifying or sorting apparatus.

Describing the operation of the system, shown above in detail, it is first desired to explain that the current system is so designed that several response marks or pips occur on the horizontal base within the sweep range of the oscillator. Basically, the system is designed to turn on with the first signal which is received through the gate by the display control section V9 and to turn off at the second signal and to remain off during the rest of the scanning action. Thus, where a plurality of signals are provided by resonance in one sweep across the band, when the device is originally adjusted, it is the distance between two signals that provides the measuring pulse. It is not critical as to which pulses are selected as those to open and close the circuit but it is essential that the same two pulses be continuously used throughout any measuring or classifying action. Thus, the fundamental or first harmonic response pulse might be used to turn the system on and the next or second harmonic to turn it off. But usually the distance between these two pulses is relatively great and would necessitate a greater sweep frequency band over which the oscillator must scan if used. It is therefore desired to use some of the higher frequencies where the actual spacing is not so great.

Once the device is turned on and the oscillator V3 drives the transducer over a frequency band as controlled by the section V2, a series of vertical pips or pulses is developed during each scanning action. Considering one complete action the time base oscillator provides a triggering signal to synchronize the whole system. This starts the oscillator frequency control to cause the ultrasonic oscillator V3 to scan over the band for which it is designed. At the same time a delay is provided in section V6 which prevents the gate V8 from operating for a very small section of the scanning period so that the oscillator can start driving the transducer without the indication of erroneous signals. Shortly thereafter, the gate time generator V7 applies a pulse to the gate V8 to open the same. The gate will now permit an indicating pulse to be applied to the display control V9, and as the oscillator tunes across the band a first pulse will be obtained through resonance of the part, which pulse will be clipped and amplified in the section V4 and applied to the display control.

This pulse will be applied to the display control since the gate has been opened and will apply a further control pulse through the display control V9 to the various vertical and horizontal amplifiers. This causes a voltage to be applied to the vertical deflector 4 and maintains the voltage thereon although the originating pulse disappears. This is best indicated in FIGURE 1A where a diagrammatic showing of the trace on the cathode ray head 656 is shown. In this instance, instead of causing the trace to sweep from left to right, as is normally the practice, the trace is initiated at the right and sweeps to the left. Therefore, trace 658 indicates by the elevation the arrival of the first signal after it has begun to sweep since the horizontal trace moves up to its upper level. The arrival of the second signal closes the gate V8 and through the feedback coupling reduces the voltage to the vertical deflecting yoke causing the horizontal trace to return to its original position and causing a vertical trace 660 at the calibrated line to indicate the thickness of the part. This might, for example, represent .150 of an inch. Having cut off, the gate is now closed for the remainder of the scanning action and will not be open again until the next scan is initiated. If no vertical actuating signal and therefore no trace such as 660 is encountered during the trace from right to left until a point 662 is reached, then the arrival of the actuating wave at that point will cause a red light to be energized indicating that the dimension to be measured is outside the range, and that the whole system should be adjusted. Thus, when this system is turned on, the operator merely has to look at the cathode head and a vertical step wave will appear whose leading edge is at exactly the thickness of the part and its horizontal position on the calibrated scale on the head will give a clear and definite reading of this thickness.

It is seen from FIGURE 7 that there are several pulses which appear on the gate V8 in one scanning action and directly below it two pulses are illustrated. The stepped wave on V9 is shown at R. Thus the distance between the two pips shown at position R of the wave chart produce a stepped wave whose width is indicative of the thickness of the part being gauged. As previously mentioned, any type of indicating or selecting equipment can be operated by the output of the flaw relay control or relay tube. These may be likewise mechanical directive means for sorting or any other suitable mechanism.

FIGURE 6 is also a diagrammatic showing of a system whereby instead of the light being illuminated or parts being classified, a digital indicator may be operated to give a direct reading of the thickness of the part being tested. Such a system is shown in block diagram form in this figure. The first block labeled "Ultrasonic Oscillator and Gating Circuit" represents that portion of the system shown in FIGURE 1 which includes the sections V1 through V9 inclusive together with the transducer. As will be obvious from the previous discussion, this portion of the system develops a square wave pulse whose width is proportional to the thickness being gauged within the predetermined range. Such a pulse is diagrammatically illustrated at 640 as appearing on the output line of the ultrasonic oscillator and gating circuit 642. In this instance the width of the pulse is indicative of the thickness of the part to which the transducer is applied. This pulse is fed into a pulse converter or integrator 644 in which section it is converted into a D.C. voltage which is proportional to the pulse width $t$.

We now have on the output line 646 a D.C. voltage whose value is proportional to $t$ where $t$ is the time width of the pulse. It is necessary to convert this time pulse voltage into one proportional to the thickness in thousandths of an inch and the function generator section 648 ning cycle on to the oscilloscope so that only the distance between two resonant pulse signals is indicated on the oscilloscope.

6. In measuring means, an oscillator having an output circuit, means connected to the oscillator for repetitively tuning it over a predetermined band of frequencies, an electro-mechanical transducer connected in said oscillator output circuit which is adapted to be placed upon a part to be tested to mechanically drive the same whose impedance will be varied as the part is set into resonance at a plurality of different frequencies as the band of frequencies is scanned which develops a pulse in said oscillator output circuit at each resonant frequency, an oscilloscope having a vertical and a horizontal deflecting means, amplifying means connected to the output circuit of the oscillator which amplifies any output pulses generated when a resonant point is reached during the scanning cycle, said amplifying means being connected to the vertical deflecting means of the oscilloscope so that pulses received will produce vertically deflecting signals on the oscilloscope, gating means connected between the amplifying means and the vertical deflecting means of the oscilloscope to control the application of the generated pulses to the vertical deflecting means, switching means connected to the gating means to control the same, said gating means including a flip-flop multivibrator circuit connected in feedback relation to said switching means to provide a conductive path for the first resonant pulse received from the amplifying means during a single scanning cycle and then switch to the opposite conductive path of the flip-flop circuit on the second resonant pulse received by the gating means during that scanning cycle to close the gating means for the remainder of the scanning cycle, synchronous timing means producing a starting pulse for initiating a scanning cycle connected to both the means to repetitively tune the oscillator and to the switching means to initiate each sweep and open the gating means and delay means connected between the gating means and the synchronous timing means to delay the opening of the gating means for a short time period after the initiation of each oscillator sweep.

7. In measuring means, an oscilloscope having horizontal and vertical deflecting means upon which an indicating trace is developed, an oscillator having an output circuit, means connected to the oscillator for tuning it over a predetermined band of frequencies, an electro-mechanical transducer connected in said output circuit of the oscillator adapted to be applied to parts to be tested to cause mechanical vibration and resonance of the parts at fundamental and harmonic frequencies during a single scanning freqeuncy sweep, amplifying means connected to said oscillator output circuit to amplify the pulses produced by the change in load on the oscillator upon arrival at any of the resonant frequencies of the part, display control means connected to the amplifying means and to the horizontal and vertical deflecting means of the oscilloscope to control the latter so that pulses amplified by said amplifying means will define a trace on the oscilloscope indicating means, gating means connected between the display control means and the amplifying means to control the passage of said pulses from the amplifying means to the display control means, synchronizing master pulse generating means connected to the gating means and to the means for tuning the oscillator to produce an indicating trace on the oscilloscope and initiate a tuning cycle and to the display control means to reset the display control means at the end of a tuning cycle, delay switching means connected between the synchronizing master pulse generating means and the gating means to control the latter, a feedback circuit connected from the display control means to the switching means to actuate the same on each second amplified resonant pulse received in a cycle by the display control means to close the gating means, relay switching means connected to the display control means whose energization period is controlled by the display control means and which is used to indicate the thickness of parts being tested, and means connected between the relay switching means and the display control means to feedback a signal to expand the energization period for the relay switching means so that only one indicating step pulse is produced per cycle.

References Cited in the file of this patent

UNITED STATES PATENTS

| 2,466,711 | Kenyon | Apr. 12, 1949 |
| 2,538,114 | Mason | Jan. 16, 1951 |
| 2,603,966 | Drake | July 22, 1952 |
| 2,672,392 | Caples et al. | Mar. 16, 1954 |
| 2,800,789 | Henry | July 30, 1957 |
| 2,883,860 | Henry | Apr. 28, 1959 |
| 2,888,824 | Henry | June 2, 1959 |

FOREIGN PATENTS

| 949,375 | Germany | Oct. 18, 1956 |